Figure 1:
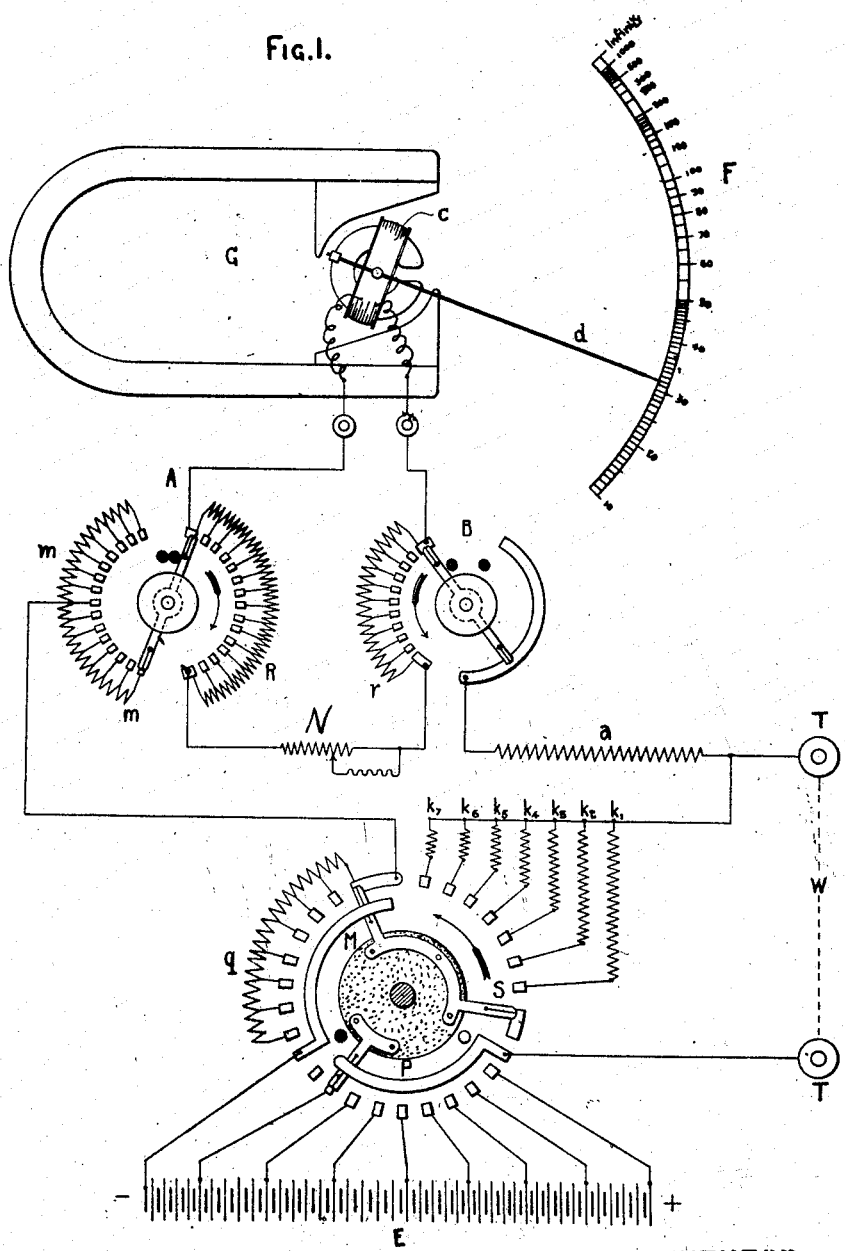

S. EVERSHED.
TESTING OF INSULATION.
APPLICATION FILED MAR. 21, 1914.

1,212,467.

Patented Jan. 16, 1917.
8 SHEETS—SHEET 1.

WITNESSES:

INVENTOR:
Sydney Evershed,
BY
ATTORNEYS.

S. EVERSHED.
TESTING OF INSULATION.
APPLICATION FILED MAR. 21, 1914.

1,212,467.

Patented Jan. 16, 1917.
8 SHEETS—SHEET 7.

WITNESSES:

INVENTOR:
Sydney Evershed
BY
ATTORNEYS

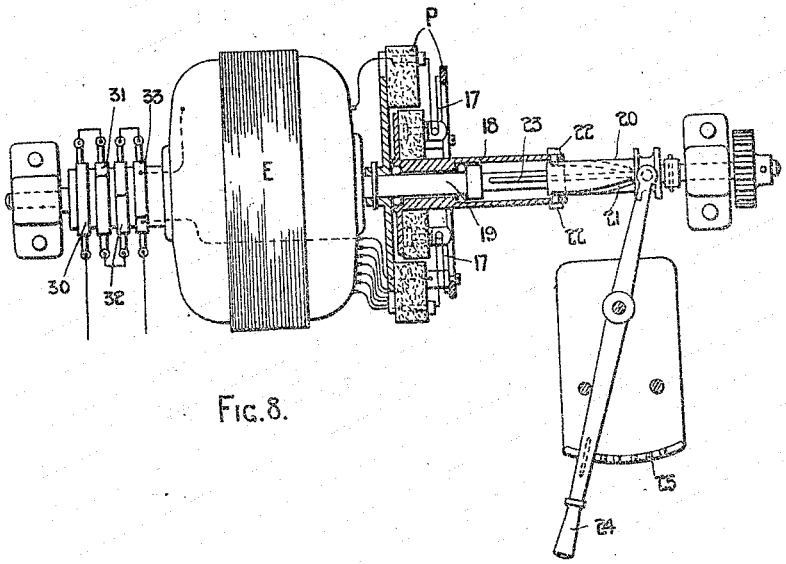
Fig. 8.
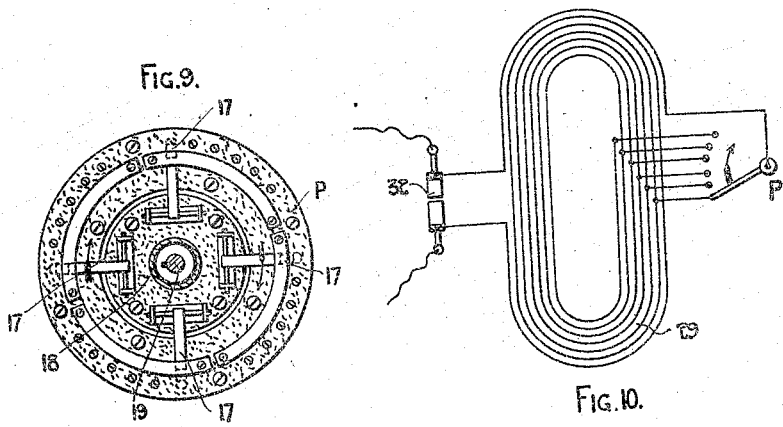
Fig. 9.
Fig. 10.

UNITED STATES PATENT OFFICE.

SYDNEY EVERSHED, OF CHISWICK, LONDON, ENGLAND.

TESTING OF INSULATION.

1,212,467.  Specification of Letters Patent.  Patented Jan. 16, 1917.

Application filed March 21, 1914. Serial No. 826,372.

*To all whom it may concern:*

Be it known that I, SYDNEY EVERSHED, a subject of the King of Great Britain and Ireland, and residing at Acton Lane Works, Chiswick, London, W., England, have invented certain new and useful Improvements Relating to the Testing of Insulation, of which the following is a specification.

This invention relates to the testing of the insulation of electric systems and appliances and its object is to provide an improved method and means for ascertaining the condition of the insulation.

It has been known for many years that the resistance of insulation under ordinary working conditions is usually a good deal less at a high voltage than it is at a low voltage, and for that reason it is customary to make insulation tests at some pressure not less than the working voltage, a practice which dates from the introduction of testing apparatus invented by me in or about the year 1889.

I have discovered by experimental research that one of the causes of the lower resistance at higher voltage is the presence of moisture in absorbent insulating materials in the form of drops and thin films which form leakage paths for electric current. When an insulator in that condition is subjected to electric pressure the propelling force known as electric endosmose drives water out of the drops into the films, thereby increasing their thickness and therefore decreasing the resistance of the leakage paths.

If the electric pressure is gradually increased the insulation resistance of absorbent materials falls, rapidly at first but more and more slowly as higher pressures are attained and the relation of voltage to insulation resistance may be expressed by a smooth curve which is convex to the base line from which resistance ordinates are measured, so long as the endosmose or film effect is the principal factor in determining its shape or law of curvature. Ultimately, if the increase in voltage is continued, the curve passes through a somewhat ill-defined point, or rather region, of inflection, and changing the direction of its curvature begins to bend downward toward zero resistance, the downward curvature rapidly increasing until actual breakdown occurs. The complete characteristic curve, as it may be called, consists therefore of two parts of opposite curvature joined at a point or region of inflection, the first part indicating the film effect already described, and the second part indicating the growth of a dangerous mode of leakage which ultimately ends in a breakdown of the insulation. These two significant parts of the whole curve may be conveniently referred to as the film curve and the breakdown curve.

The law expressing the shape of the film curve is much the same for all absorbent materials, provided they do not contain more moisture than they can harbor in the form of drops and thin films; and the leakage which takes place under that condition is not of a dangerous character, since it merely consists in each film path carrying a current which is well within its capacity as a conductor. Changes in the number of films acting in parallel do not affect the safety of the insulation, nor do they alter the law of the curve, although an increase or decrease in the number of film paths necessarily lowers or raises the general level of the curve. Hence so long as the shape of the first part of the characteristic curve indicates conduction by films, the general level of the curve—high or low insulation resistance—is not a matter of much importance. On the other hand the presence of an excessive amount of moisture, particularly when it is in the form of local accumulations of water in bulk, is apt to produce a dangerous condition in consequence of the extensive electrolytic action which takes place under such conditions if the excess of water is not detected and removed before the conductors and insulating materials have been seriously damaged. But leakage conduction of this kind follows Ohm's law, that is to say, the resistance does not vary with the voltage, and the characteristic curve would indicate this law by following a straight line parallel with the base line. Hence the shape of the first part of the characteristic curve enables safe and dangerous modes of leakage through damp insulating materials to be readily discriminated. Again, in those numerous cases in which the insulation is made up of two components in series, one an absorbent material, and the other a non-absorbent substance which has a constant resistance, the shape of the first part of the characteristic curve will be the resultant of the two corresponding modes of conduction. Hence the failure of either component will be accompanied by a change in the shape of the curve, which will assume the shape of a normal film curve if the non-absorbent insulator breaks down, or will lose its film characteristic and become a straight line parallel to the base if the failure is in the absorbent insulator. Lastly, the region of inflection in the characteristic curve is a highly significant feature, since it is there that a dangerous mode of leakage begins to be indicated. Broadly speaking the place where moisture conduction ceases to be the paramount influence, and the curve begins to bend downward may be regarded as the limit for safe working and so long as the working voltage does not carry the characteristic curve beyond that point the insulation is not in danger. In these and other ways the characteristic curve whether drawn with resistance ordinates or conductance ordinates, provides for the first time a method of insulation diagnosis, and the present practice of testing insulation may therefore be usefully amplified in the light of my discovery.

The invention consists in a method of diagnosis for ascertaining the condition of insulation by actual or implied reference to the whole or any significant part of the characteristic curve deduced from tests of the resistance or conductance of the insulation at two or more suitably chosen and different voltages.

The invention also consists in the improved method for the testing of insulation herein described.

Much of the utility of my method of diagnosis consists in comparing the law of shape of different characteristic curves obtained either from the insulation of an electric system or appliance at different times under varying natural conditions, or from different electric systems or appliances or circuits.

In carrying out the invention the testing apparatus is arranged and adapted to facilitate such comparisons by reducing the resistance ordinates of all characteristic curves to numerical scales which are convenient for comparison preferably so that all curves shall have one coördinate point in common, which is preferably the initial point of the curve corresponding with the minimum testing pressure. By this procedure all other points on the curves are expressed by their ratios or percentages with regard to the common point. To carry out this part of the invention the resistance measuring instrument or appliance is modified by the addition of a device adapted to vary the sensibility of the instrument continuously or substantially so, over a considerable range, so that upon making the first test to determine the initial or common point, the indication of the instrument may be adjusted until it registers one hundred or one thousand, or ten, or unity or some other decimal multiple or sub-multiple, of a hundred. When this adjustment has been made the resistance ordinates of the other test points on the curve will evidently be indicated as percentages of the initial resistance ordinate and the law of one curve may be readily compared with that of any other curve without the necessity for any calculations, and in many cases without even going to the trouble of plotting the characteristic curves. Again, when the object of the tests is to investigate some particular portion of a characteristic curve by the comparison of differences, as for example, when it is intended to ascertain the position of the point or region of inflection, then in carrying out the invention the testing apparatus is arranged and adapted to facilitate the comparison of one difference with another, preferably by means of adjustable rheostats (herein referred to as "decrement rheostats") adapted to give direct indications of the differences in the resistance (or conductance) of the insulation, corresponding to successive increments of testing pressure.

In carrying out the invention the measuring instrument or appliance may be of any known type suitable for the measurement of insulation resistance or insulation conductance, but although the properties of insulators may be expressed in terms of either resistance or conductance, it has so long been the custom to regard resistance as the criterion of insulation that in describing the invention in detail it will be assumed that the testing apparatus is required to determine characteristic curves in terms of voltage and resistance.

As a matter of convenience in testing the indicating instrument may be so arranged that insulation resistance or conductance may be measured in the customary units whenever so desired without in any way limiting the power to vary the sensibility at will for the purpose of obtaining ordinates which are readily comparable.

The necessary testing pressures may be provided by a battery or alternatively by a dynamo or a magneto generator of direct current type, either hand driven or power driven as may be convenient, and adapted by means of multiple voltage devices to give the required series of testing pressures. A series of from ten to twelve pressures, suitably graded, will generally enable the complete characteristic curve to be investigated or drawn up to the breakdown point if the maximum pressure of the series is sufficient for the purpose. A series of six to eight pressures will generally suffice to draw the first part of the characteristic curve from about 50 volts up to the point of inflection and if the sole object is to determine the position of the point of inflection with respect to some assigned pressure—the working voltage of the system for example—then a series of three pressures will be enough. Any known principle either alone or in combination may be used for obtaining the multiple voltages required by my method of testing, as for example by a subdivided battery, or by varying the speed of a dynamo, or by varying the induction or the number of effective turns of wire in the armature of a dynamo, or by a number of windings on a single armature each connected to one of a corresponding number of commutators, or by a multiple armature each element having its appropriate winding.

Figure 2:
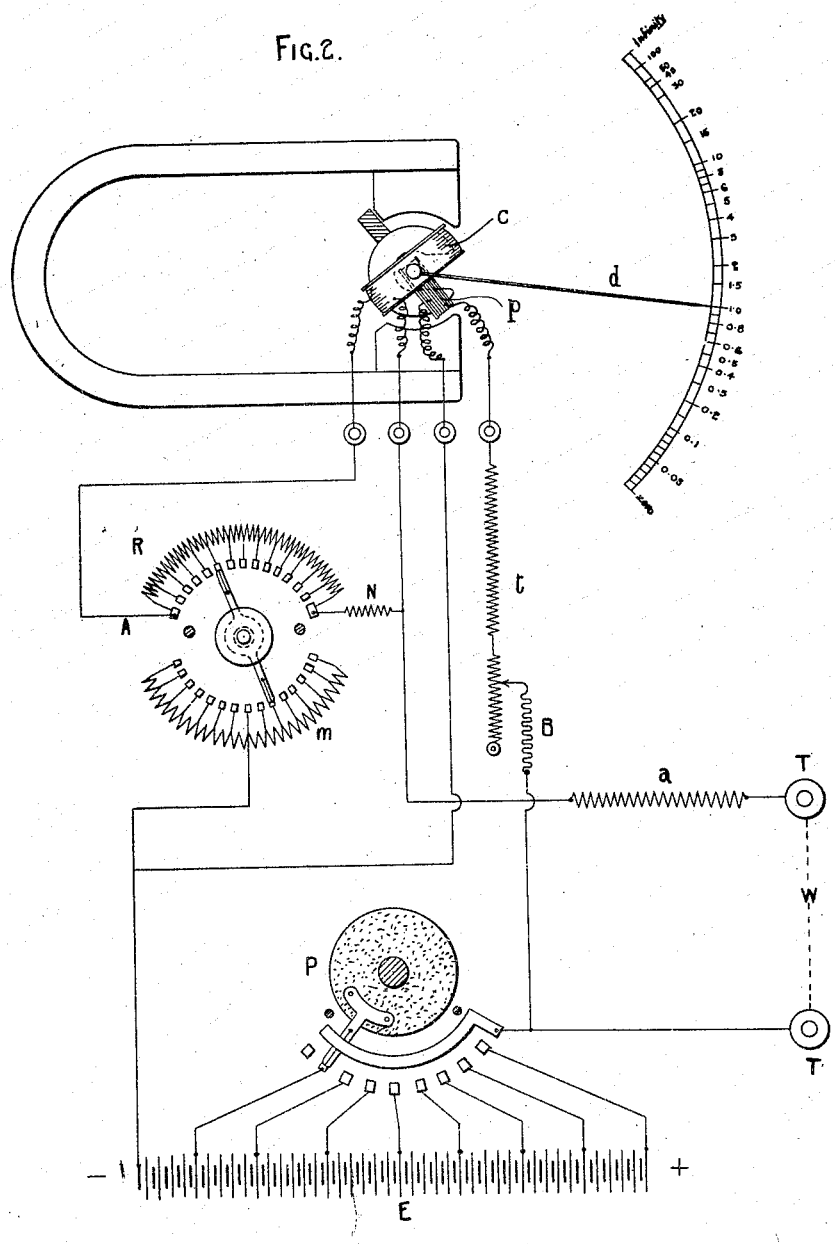
Figure 3:
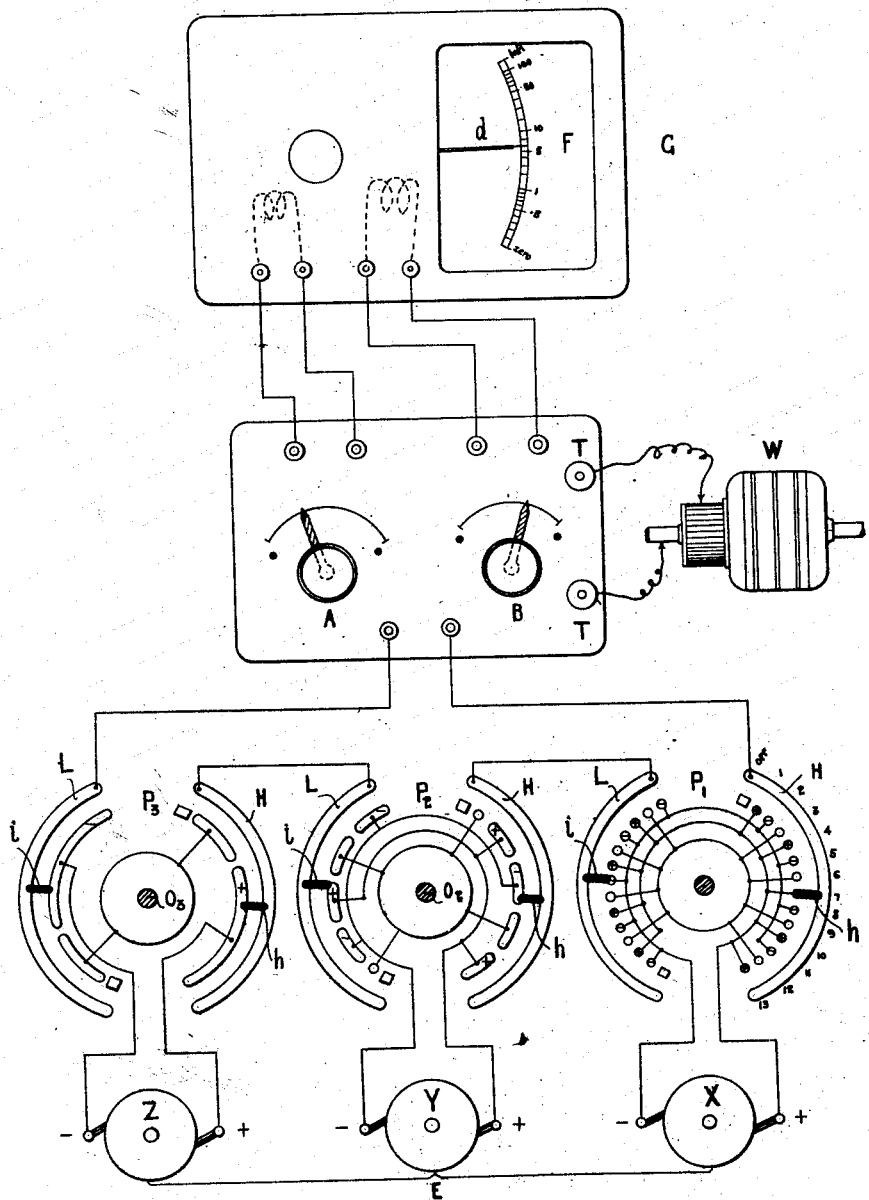
Figure 4:
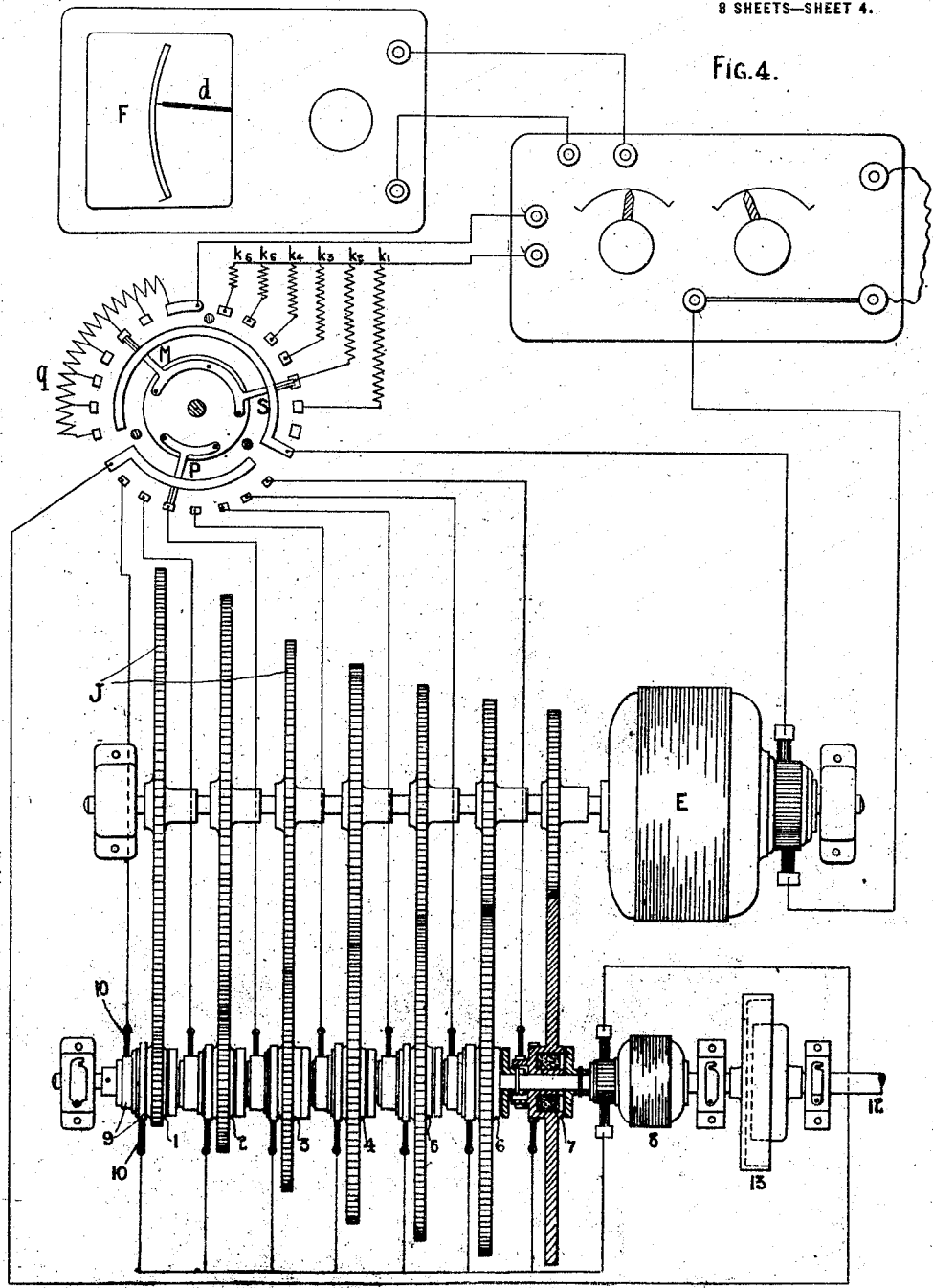
Figure 5:
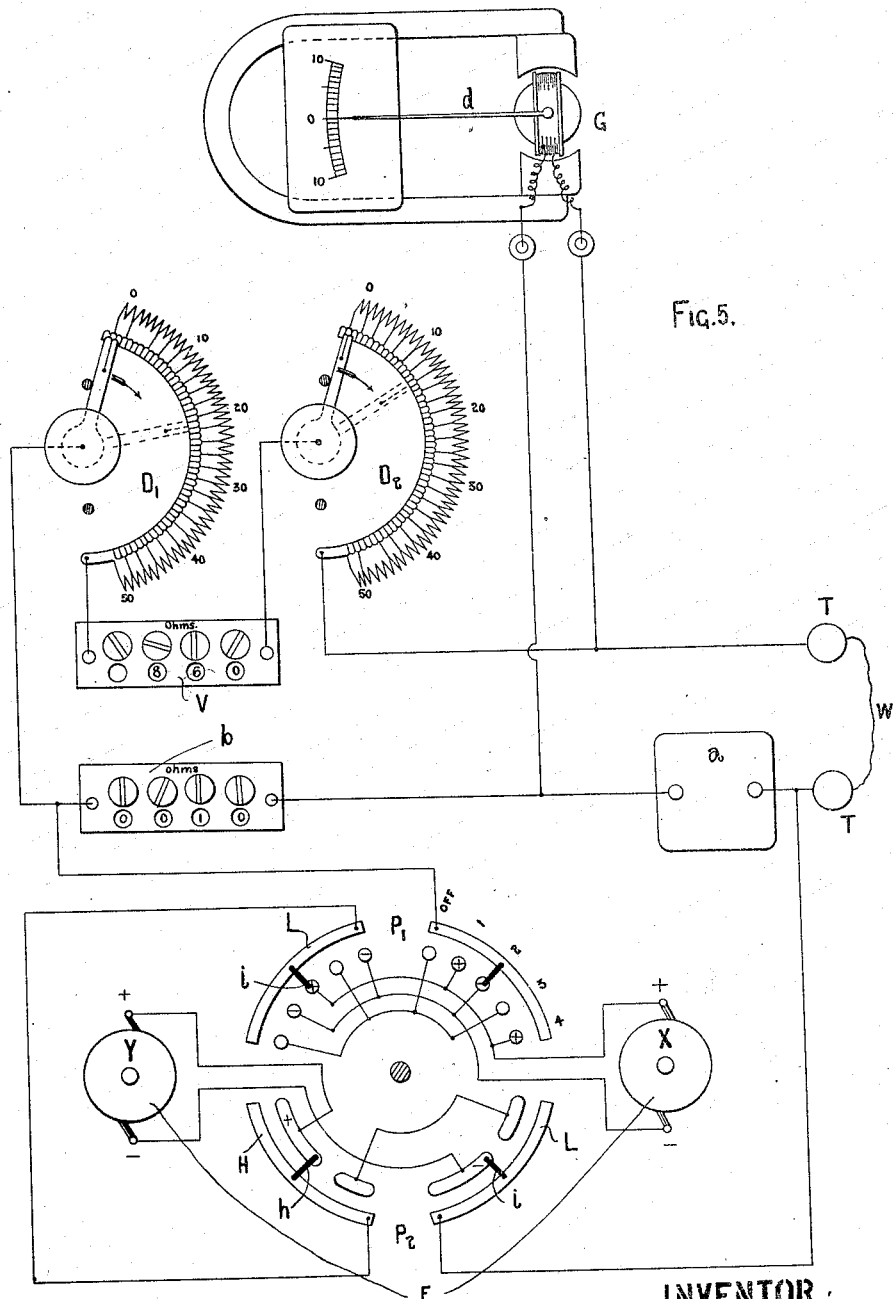
Figure 6:
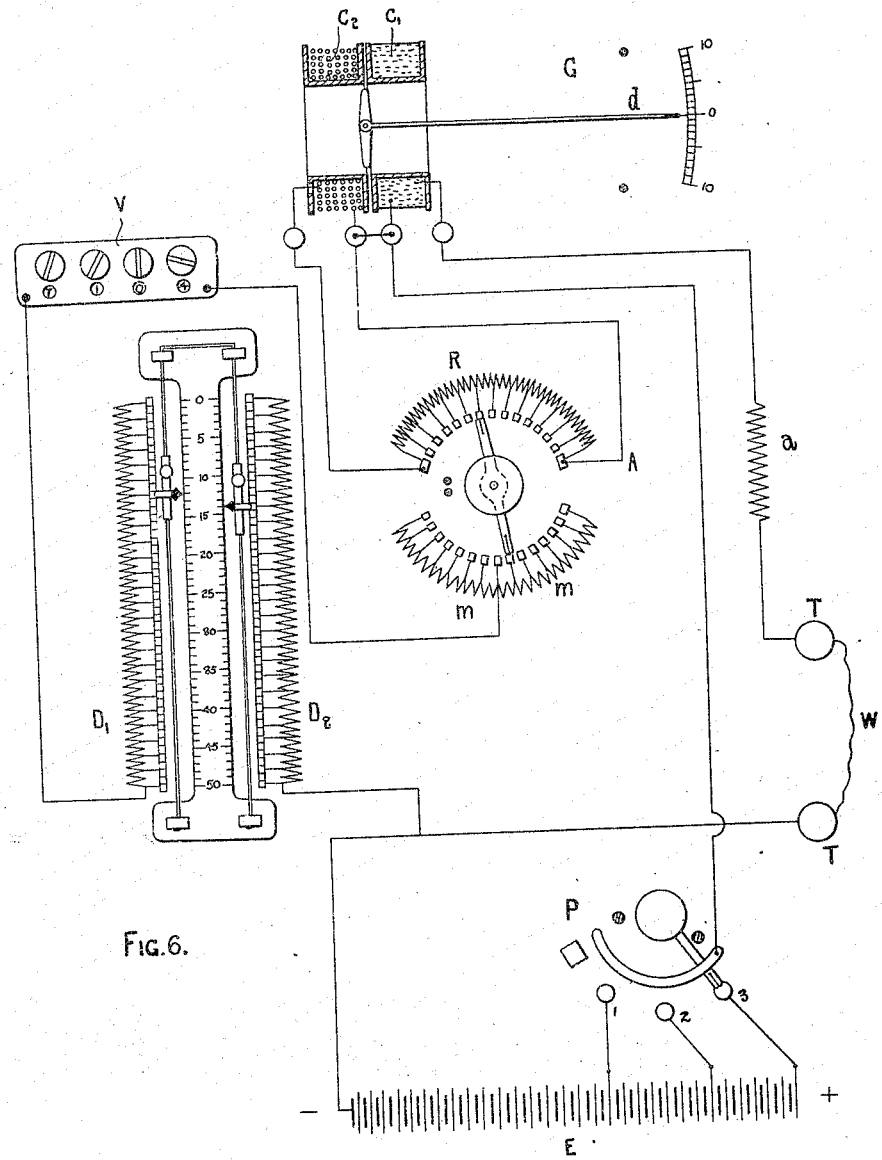
Figure 7:
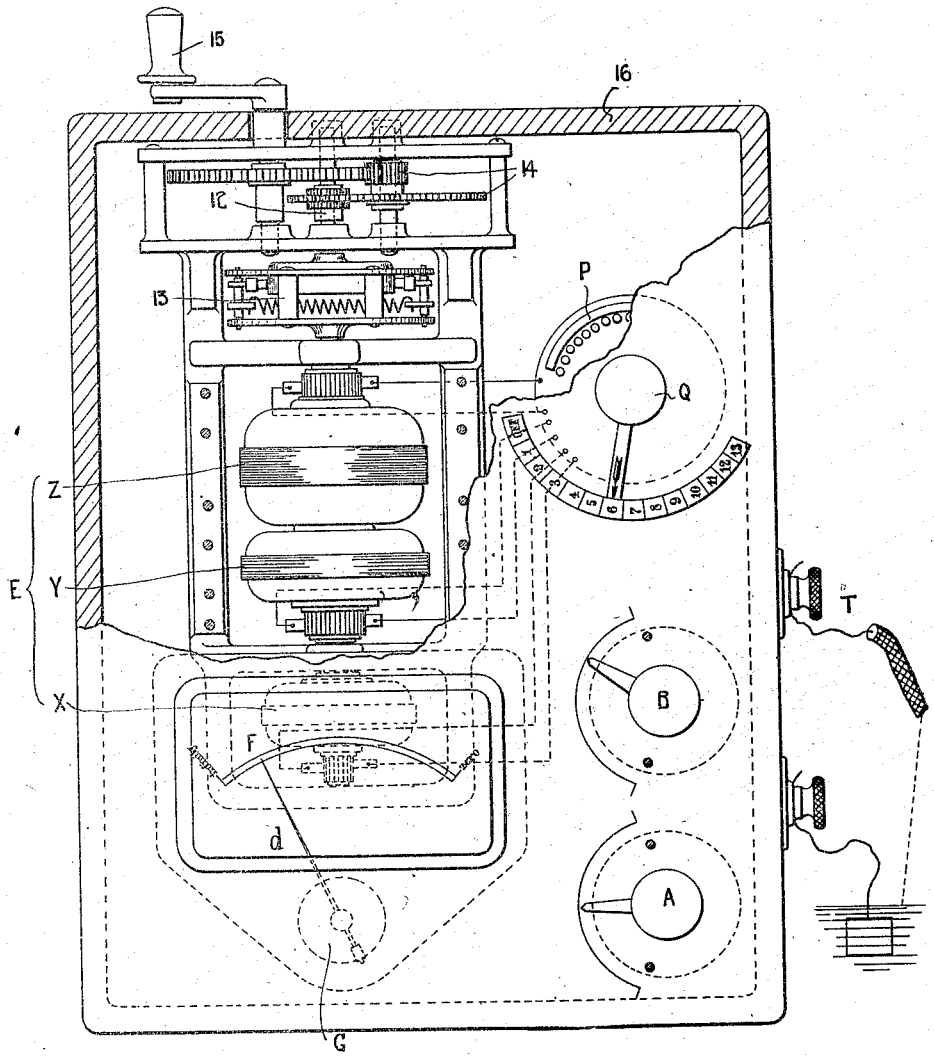

In order that the invention may be better understood it will now be described with reference to the accompanying drawings of which:

Figure 1 is a diagram of a complete apparatus for investigating the whole or any part of the voltage-resistance curve of insulation; Fig. 2 is a modification of the same in which the indicating instrument is an ohmmeter; Fig. 3 is another modification in which the electro-motive forces generated by three dynamo armatures are combined to form a series of testing pressures by means of a permutation switch; Fig. 4 is another modification of the same in which the speed of the generator which provides the testing current is varied by means of a change speed gear in order to give a series of testing pressures; Figs. 5 and 6 are modifications of the same, each adapted for the investigation of a limited part of the voltage-resistance curve; Fig. 7 illustrates apparatus for carrying out my method arranged in a box for portability; Figs. 8, 9 and 10 show a modified form of multiple voltage generator; in Figs. 3, 4, 5, 7 and 8 the armatures of the multiple voltage generator are alone shown, the field magnets and pole pieces being omitted in order to avoid confusion.

In Fig. 1, E is a source of direct current adapted to give a suitable series of testing pressures. P is a multiple point switch adapted so as to apply any of the series of pressures to the insulation resistance W which is to be investigated. G is an indicating instrument adapted to show the value of the resistance under test, and A and B are two parts of a variable shunt to the instrument coil C, by means of which the initial reading of a series may be adjusted to some convenient initial or common point. T T are the terminals which serve to connect the testing apparatus to the insulation resistance which is to be tested.

In Fig. 1 the indicating instrument G is shown by way of example as a galvanometer, $c$ being the galvanometer coil, $d$ the index and F the scale. To obtain readings which are proportional to the resistance of the circuit the scale is shown divided and figured in inverse proportion to the current traversing the coil $c$, and to adjust the initial reading of a series to a common point the coil $c$ is connected to a variable shunt which may conveniently be of the Ayrton-Mather "universal" type as shown in the drawings. To provide for coarse and fine adjustments the shunt is divided into two parts R and $r$ each sub-divided into a convenient number of sections and controlled by a multiple point switch. For convenience the resistance $r$ may be equal to a single section of the larger resistance R. To maintain the resistance of the shunted galvanometer at an approximately constant value the switch A is provided with a second switch arm which controls a series of "make-up" resistances $m\ m$, and as a universal shunt gives the maximum resistance to the shunted galvanometer (i. e. to the combined galvanometer coil and the part of the resistance in parallel with it) when the current divides equally between the galvanometer coil and the shunt, the make-up resistance will be reduced to zero at that point. A resistance $a$ of large value is added in series with the shunted galvanometer in order to avoid excessive currents when the resistance W happens to be very low or to break down under test. The value of $a$ may easily be made ten or even one hundred times as great as the resistance of the shunted galvanometer so that a comparatively rough adjustment of the make-up resistances $m\ m$ will be sufficient.

In order that the galvanometer G may indicate in the same resistance units throughout the whole series of testing pressures, the voltage switch P is mechanically coupled to a multiple-point shunt switch S which controls a number of resistances $k_1$, $k_2$, $k_3$, etc., which serve as a series of shunts on the combined resistance formed by the resistance $a$ and the shunted galvanometer. The value of each of these shunts is reckoned from the formula:—

Resistance of shunt $k\pi = (a+g)/(n-1)$, where $g$ is the constant resistance of the shunted galvanometer and $n$ is the ratio of the testing voltage (for which the shunt $k\pi$ is required) to the initial voltage of the ascending series of testing pressures. In Fig. 1 the source of testing pressure E is shown by way of example as a battery subdivided into eight equal sections and controlled by the eight point switch P. Hence the shunt switch S also has eight positions and at the first point, corresponding with the testing pressure of a single section of the battery, the switch S stands at a blank contact so that the whole of the testing current traverses the circuit formed by the galvanometer G and the universal shunt A B. In this example the values of the shunts $k_1, k_2, k_3 \ldots k_7$, must evidently be $(a+g)$, $\frac{1}{2}(a+g)$, $\frac{1}{3}(a+g) \ldots \frac{1}{7}(a+g)$. It is desirable that the total resistance of the current circuit of the testing apparatus should be constant notwithstanding the effect of the shunts introduced by the switch S, and with this object another switch M is added to control a series of make-up resistances $q$.

In Fig. 1 the apparatus is shown with the initial voltage of the series applied for testing the insulation represented by W, and the common point shunt A B is set for the minimum shunting effect. When so set the scale F may conveniently be arranged to read direct in megohms, and in that case the pointer $d$ indicates 32 megohms. To bring the pointer to the required common point—in this example the scale division marked 100 would naturally be chosen as the initial or common point—the shunting effect is gradually increased by moving the contact arms of the shunt A B in the direction of the arrows, first obtaining a rough adjustment by means of A and next making a fine adjustment by means of B until the pointer stands at the scale reading 100. To facilitate the accurate setting of the pointer to the desired initial reading, a small continuously adjustable rheostat may be introduced as indicated at N.

Having set the galvanometer reading to the common point the voltage is then increased step by step by turning the voltage switch P in the direction of the arrow, the switches S and M being of course carried around from point to point at the same time. Proceeding in this way, eight ordinates of the voltage resistance curve of the insulation W, (corresponding with the series of eight testing pressures) are rapidly obtained, and if the initial ordinate be adjusted to 100 then all the others are expressed as percentages and may be readily compared with other ordinates obtained from other insulation or from the same insulation under different conditions. With this apparatus the insulation resistance of W at any desired voltage of the series may be obtained in megohms at any time by merely restoring the common point shunt A B to the initial position of minimum shunting effect.

In Figs. 2 and 2ª the indicating instrument G is an ohmmeter, $c$ being the current coil, and $p$ the pressure coil. The coarse adjustment to a common point is effected by a universal shunt A on the current coil, and the fine adjustment may be effected by similar means to those shown in Fig. 1, or preferably by forming a part of the resistance $t$ (which is in series with the pressure coil $p$) as an adjustable rheostat B. In Fig. 2 the adjustments A and B have already been effected and the pointer $d$ is shown standing at the scale division marked 1 preparatory to raising the testing voltage step by step to obtain the required series of resistance ordinates. In this example the switches S and M are dispensed with because the substitution of an ohmmeter in place of a galvanometer as the indicating instrument renders it unnecessary to make any provision of the kind. In either case by whatever means the step by step adjustments of the measuring instrument are made to correspond with the pressure it is convenient to have the adjustment devices geared to or interlocked with the devices which effect the changes in testing pressure, so that corresponding adjustments and voltage changes may be carried out either by the movement of one handle or by the coordinated movements of two interlocked handles. The measuring instrument may conveniently have the scale so divided and figured that it gives direct readings in ohms or megohms when the instrument is arranged to give the maximum sensibility, as for example when the shunt for continuous variation of sensibility is set for the minimum shunting effect.

In Fig. 3 the testing pressure E is provided by three dynamo or magneto armatures X Y Z, so coupled together mechanically—preferably by mounting them on one axle—as to constitute a multiple-voltage testing generator. This generator which may be driven by hand or by power, is adapted to run at a constant speed either by means of a centrifugal clutch or other known means such as a constant speed motor. The three armatures are so wound as to give three component pressures which when added algebraically, will give a number of suitable testing pressures. For example if the initial pressure is to be $e$ bolts then armature X should be wound to give $e$ volts, and to obtain the greatest number of testing pressures from the three armatures, Y and Z must be wound to give $3e$ volts and $9e$ volts respectively.

The armatures X Y and Z are connected electrically to the three members $P_1$ $P_2$ $P_3$ of a triple permutation switch. Each of these members consists of a multiple point double-pole switch; $P_1$ having 13 points to each pole, $P_2$ having 5 points to each pole; and $P_3$ having 2 points to each pole. Insulated sliding contacts $h$ $i$ which serve to connect any pair of points with the slip rings H L, are fixed to and rotate with the axles $O_1$ $O_2$ $O_3$ and these axles are mechanically coupled so that they all rotate together in the same sense and through equal angles. For example the three members of the permutation switch may be mounted one above the other so that the insulated contacts $h$ $i$ may be fixed to an axle which is common to all three members. The internal connections of the switch points are such that in the case of the member $P_1$ the potential difference between the slip rings H and L is alternately $+e$, $-e$, zero, $+e$, $-e$, zero, and so on as the axle O is rotated in a clockwise direction from point 1 to point 13. During these step by step changes the potential difference between the slip rings of the member $P_2$ is as follows:—zero, $+3e$, $+3e$, $+3e$, $-3e$, $-3e$, $-3e$, zero, zero, zero, $+3e$, $+3e$, $+3e$; and the potential difference between the slip rings of the member $P_3$ is zero for the first 4 steps made by $P_1$ and $+9e$ during the remainder of the 13 steps. These permutations result in the algebraic addition of the three component pressures generated by the armatures X Y and Z in 13 different ways as set forth in the following table:

| Step number. | Potential difference of slip rings on members. | | | Algebraic sum of the component pressures. |
|---|---|---|---|---|
| | $P_3$. | $P_2$. | $P_1$. | |
| 1 | 0 | 0 | $+e$ | $e$ |
| 2 | 0 | $+3e$ | $-e$ | $2e$ |
| 3 | 0 | $+3e$ | 0 | $3e$ |
| 4 | 0 | $+3e$ | $+e$ | $4e$ |
| 5 | $+9e$ | $-3e$ | $-e$ | $5e$ |
| 6 | $+9e$ | $-3e$ | 0 | $6e$ |
| 7 | $+9e$ | $-3e$ | $+e$ | $7e$ |
| 8 | $+9e$ | 0 | $-e$ | $8e$ |
| 9 | $+9e$ | 0 | 0 | $9e$ |
| 10 | $+9e$ | 0 | $+e$ | $10e$ |
| 11 | $+9e$ | $+3e$ | $-e$ | $11e$ |
| 12 | $+9e$ | $+3e$ | 0 | $12e$ |
| 13 | $+9e$ | $+3e$ | $+e$ | $13e$ |

In Fig. 3 a triple permutation switch is shown in a simple form in order that the principle by which several component pressures may be added to give a series of voltages may be readily understood. Permutation switches embodying the same principle may be made to add two, three, four or more component pressures giving a series of 4, 13, 40 or more voltage steps. The mechanical construction and the disposition of the various parts of such switches may evidently be varied widely without departing from the principle of algebraic addition. By way of example the permutation switch in Fig. 3 is shown in connection with a common point adjuster A B and an ohmeter G. The insulation resistance W, under test, is that between the commutator and windings of an armature and the armature axle.

In Fig. 4 the testing voltage is supplied from a variable speed generator E which is driven from the shaft 12 through a centrifugal constant speed clutch 13 and change-speed gear J. Seven pairs of gears are shown suitably graduated as regards velocity ratio, and by way of example these gears are shown as actuated by means of seven friction clutches 1, 2, 3, ... 7 of the magnetic type. These clutches are controlled by a multiple point switch P, current being led to the exciting coils of the clutches by means of slip rings and brushes as indicated by 9 and 10. Current for the magnetic clutches may be derived from any suitable supply, and in the absence of any other available source a small dynamo may be provided for the purpose and driven at a constant speed, preferably by mounting its armature 8 upon the constant speed shaft of the change-speed gear. The connections of the galvanometer indicated correspond to Fig. 1ª.

Other known forms of change-speed gear may be employed preferably of the types which are actuated by friction clutches, and when the indicating instrument G is a galvanometer, the mechanism which actuates the clutches should be mechanically connected to or interlocked with the voltage shunt switch S and "make-up" switch M. This interlocking connection is of course effected in the simplest possible manner when magnetic friction clutches are used.

When the object of the tests is to investigate some assigned portion of the characteristic curve a comparison of differences may be made. For example, to ascertain whether at any assigned voltage E, the characteristic curve has reached or passed beyond the point or region of inflection, it is sufficient to test the insulation at three pressures namely $E-e$, E, and $E+e$ volts, and to ascertain the corresponding resistance values, say $a$, $b$, and $c$, respectively. Then if it is found that $b-c$ does not exceed $a-b$ the curve has not been carried beyond the point of inflection by subjecting the insulation to the pressure E. Those who are acquainted with the mathematical theory of curves will understand that this process of comparison is based upon the fact that at a point of inflection $dr/dE$ has its minimum value and $d^2r/dE^2$ changes its sign on passing through zero. In most characteristic curves of insulation the point of inflection is somewhat ill-defined, being a region of inflection rather than a point, and it is therefore generally impracticable to make the necessary test with small increments of pressure. In practice it will often be necessary to make the difference $e$ volts as much as one fifth or even one fourth the value of the assigned pressure E, in order to insure a measurable difference in the corresponding resistance values. Hence the differential sensibility of the measuring instrument should be as great as possible, and for carrying out the process of comparison of differences a Wheatstone bridge or a differential galvanometer is more suitable than a galvanometer or an ohmmeter of ordinary type. In carrying out this part of the invention the preferable type of measuring instrument is a Wheatstone bridge. In one form the bridge has ratio arms capable of adjustment to any value over a wide range in order that insulation resistances of widely different magnitudes may be balanced. The resistance in the third arm, corresponding with the adjustable arm of an ordinary bridge, is divided into two sections, each of which is separately adjustable and so arranged as regards the marking and figuring of the resistance values that the scale reading or figures indicate the decrement or amount of resistance withdrawn or subtracted from the total amount initially contained in the third arm—the inverse of the ordinary arrangement of a rheostat, which would be figured to indicate the amount of resistance added.

In Figs. 5 and 5a $a$ and $b$ are the ratio arms of a Wheatstone bridge of which the rheostat V and decrement rheostats $D_1$ and $D_2$ form the adjustable arm. The indicating instrument G may be a sensitive galvanometer of any known type which is suitable for use with a bridge. The testing pressures may be supplied from any convenient source; by way of example a two-component generator having two armatures X and Y is shown, and their component pressures are algebraically added by a permutation switch having two members $P_1$ and $P_2$. When this modification is intended for the investigation of the shape of the voltage-resistance curve of the insulation of some electrical system at or about the working voltage then the armature Y may be wound to generate a pressure equal to the working voltage, say E volts, and the armature X may be wound to generate a fraction of that pressure, say $e$ volts. For example if E, the working voltage, be 500 volts then $e$ might very conveniently be made equal to 100 volts.

In Fig. 5 the permutation switch is shown set to the second voltage point which gives $E-e$ volts as the testing pressure. At this pressure the bridge has been balanced by first adjusting the ratio arm $b$ so that it bears a sufficiently small ratio to $a$, and then obtaining an acurate balance by adjusting the rheostat V—the decrement switches having been initially set so that each stands at zero scale reading, corresponding with maximum resistance. The permutation switch would next be moved to the third point giving a testing pressure of E volts. If the insulation resistance W, which is under test, is that of an absorbent insulator containing moisture then the raising of the voltage from $E-e$ to E volts will bring about a decrease in resistance and the bridge will be thrown out of balance. To restore the balance the control arm of the decrement rheostat $D_1$ must be moved in the direction of the arrow until the galvanometer G once more indicates a balance. The testing pressure would now be raised another step to $E+e$ volts by moving the permutation switch to the fourth point, thus bringing about a further decrease in the resistance of W and again upsetting the balance of the bridge. The contact arm of the decrement rheostat $D_2$ would now be moved in the direction of the arrow until the balance was again restored. Inspection of the readings of the decrement rheostats will now indicate at once which decrement was the greater. If the first decrement is greater than the second then obviously the resistance curve is convex to the base line at the pressure E volts. On the other hand if the first decrement is smaller than the second then the curve is concave to the base line, and if the two decrements happen to be equal then the curve must either be sensibly a straight line between the pressures $E-e$ and $E+e$, or there must be a point of inflection on the curve at some point between those two pressures. In Fig. 5 the final position of the contact arms (as shown by the dotted lines) indicates a first decrement of about 22 and a second decrement of about 14, from which it would be inferred that at the working pressure E volts the curve of insulation resistance was convex to the base line and was still some considerable distance on the safe side of the point or region of inflection. This differential process may be extended so as to ascertain any desired number of decrements of resistance by making a number of increments of testing pressure, the resistance in the third arm of the bridge being subdivided into the required number of separate sections and each section figured to indicate decrement of resistance.

Fig. 6 illustrates a modification in which a differential galvanometer is substituted for the Wheatstone bridge which has just been described. The indicating instrument G is a galvanometer having two differentially wound coils $C_1$ and $C_2$ which carry the leakage current and the balancing current respectively. In order to obtain the maximum sensibility the leakage coil $C_1$ may be wound with the greatest possible number of turns of fine wire, and since for convenience the resistance of the balancing circuit should be very small compared with the values of insulation resistance W which are likely to be measured the balancing coil $C_2$ should be wound with a relatively small number of turns of wire. If a further reduction in the relative effect of the balancing coil is required it may be obtained by means of a shunt A connected across its terminals. By way of example an adjustable universal shunt is shown.

The balancing circuit is completed through an adjustable rheostat V and two decrement rheostats $D_1$ and $D_2$. The way of obtaining the resistance decrements corresponding with voltage increments is of course analogous to that which has just been described in connection with Fig. 5.

The decrement rheostats having been set to zero scale reading, the lowest of the three testing pressures is applied by means of the multiple voltage switch P, and a balance is effected by adjusting the rheostat V a preliminary coarse adjustment being made if required by means of the adjustable shunt A. The testing pressure is then increased one step at a time and the consequent reductions in the insulation resistance are balanced one after another by means of the decrement rheostats.

In Fig. 6 the decrement rheostats are so modified that the two decrements are indicated on a scale which is common to both. By way of example the second decrement is shown larger than the first, this indicating that the insulation curve is concave to the base line, and that at the middle voltage the curve has been carried beyond the point of inflection. In Fig. 6 a fixed-coil galvanometer is shown, but any sensitive type of differential indicating instrument may be used.

For portability and convenience in use, a multiple voltage generator and a measuring instrument with or without any of the various devices herein described for facilitating the process of testing by my method, may be mounted in one box or case or the generator and any of the devices may be so mounted or again the instrument and any of the devices may be similarly mounted. One such arrangement is illustrated in plan in Fig. 7. The testing generator E shown in this drawing is of the three-component type and is arranged for hand driving by means of a winch handle 15. The necessary high speed is obtained by suitable gearing 14 interposed between the winch axle and the axle 12. One end of the axle 12 carries the friction drum of a constant speed centrifugal clutch 13, by which means the three armatures X Y and Z are driven at a constant speed whenever the slipping speed of the clutch 13 is exceeded. Since the armatures Y and X are only required to generate one-third and one-ninth the pressure generated by Z they may be suitably graduated in size, and to avoid a long span between the bearings of the armature axle, the armature X may be overhung outside the end bearing. The carrying box 16 may be so proportioned as to provide space for the indicating instrument G at one end, and for the common point adjusters A B, and the permutation switch P, alongside the multiple voltage generator and the indicating instrument.

The methods of obtaining a suitable series of testing pressures described in connection with Figs. 1 to 7 may be modified in various ways. For example when the armature of the testing generator is wound with a number of separate coils each connected to one of a number of distinct two part commutators (an arrangement commonly used in generators for insulation testing) then a series of voltages may be readily obtained from the one armature by connecting a number of tappings from each coil to a multiple point switch, the switch being mounted upon the armature axle and operated by suitable means. A multiple voltage armature constructed on this principle is illustrated in Fig. 8 where E represents an armature wound with four separate coils connected severally to the four two part commutators 30, 31, 32, and 33. Each coil has one end permanently connected to one segment of its commutator, the other commutator segment being connected to the contact arm of a multiple point switch P as indicated in Fig. 10. At suitably graded intervals in the course of the winding 29, tappings are brought to the contact studs of the switch P so that the whole or any prearranged portion of the winding may be connected to the commutator. In this way each armature coil may be made to provide a series of pressures, and by connecting the brushes of the commutators 30, 31, 32 and 33 in series, as indicated in Fig. 8, the separate pressures of the four coils are added together to provide the testing voltage.

There being four armature coils, the complete switch P in Fig. 8 will be composed of four multiple point switches as shown in end-elevation in Fig. 9. The four insulated contact arms 17 are mounted upon a sleeve 18 which is free to rotate on the armature axle 19. Guide pins 22, which project inside an extension of the switch sleeve 18, engage in spiral slots 21 formed on the outside of an operating sleeve 20. The operating sleeve can slide to and fro on the armature axle but is prevented from turning around on it by a feather 23 which engages in a keyway inside the sleeve. The operating sleeve 20 can be set at will to any one of a number of positions along the armature axle by means of the fork lever 24 which can be retained in the desired position by a notched sector 25 or equivalent device. By these means, or their equivalent, the longitudinal motion given to the sleeve 20 is converted into a rotational movement of the contact arms of the switch P and hence the switch can be set to any desired position notwithstanding the rotation of the armature.

In Figs. 8, 9 and 10, 6-way switches are shown, by way of example, corresponding to a series of six testing pressures. Similar switches may be made for a larger number of ways provided the overall diameter of the complete switch can be sufficiently enlarged to admit of the necessary addition to the number of contact studs.

The invention is not confined to the particular arrangements described, but may be modified in various ways without departing from my underlying principle of diagnosis. For example if it is desired to carry out my invention by means of voltage-conductance curves instead of voltage-resistance curves the measuring instruments would be modified to indicate conductance units. In the case of a galvanometer the modification would consist merely in dividing the scale in direct proportion to the current; in the case of an ohmmeter the scale would be divided in inverse proportion to the resistance and figured in reciprocal ohms or other units of conductance. A Wheatstone bridge or a differential galvanometer would need no modification except in the rheostats in the adjustable third arm, which would be composed of a number of unit resistances adapted so that any desired number could be connected up in parallel to give any total value of conductance. These and other similar inversions either necessary or convenient for the purpose of converting resistance measuring apparatus into conductance measuring apparatus will be readily understood by those who are conversant with the art of electrical measurement.

It is to be understood that in making measurements to determine two or more points on a characteristic curve the tests must proceed by ascending voltages from the lowest required testing pressure upward step by step to the highest pressure of the required series, in order that hysteresis effects, which are a marked feature of conduction through absorbent insulators, may be avoided.

Having now described my invention what I claim as new and desire to secure by Letter Patent is:—

1. A method for the diagnosis of the insulation in installed systems and appliances which consists in applying to the insulation a plurality of suitable and different voltages and measuring the resistances or quantities related thereto at each voltage.

2. A method for the diagnosis of insulation which consists in applying to the insulation several different voltages and measuring the resistances or quantities related thereto at each voltage the voltages being so chosen that the location of the point or region of inflection on the characteristic curve is ascertained with regard to an assigned voltage.

3. A method for the diagnosis of insulation which consists in applying to the insulation several different voltages and measuring the resistances or quantities related thereto at each voltage, the voltages being so chosen that the point or region of inflexion on a curve connecting resistance or conductance and voltage applied is included.

4. A method of testing insulation which consists in connecting the insulator in circuit with an adjustable source of electromotive force and a galvanometer of adjustable sensibility; adjusting the galvanometer deflection to a convenient initial reading upon a scale divided in units of resistance (or conductance); successively adjusting the electromotive force to a series of different voltages and simultaneously adjusting the galvanometer so that throughout the said series it shall indicate, by units of the same magnitude, the values of the insulation resistance or conductance corresponding to the series of electromotive forces.

5. A method of testing insulation which consists in connecting the insulator in circuit with an adjustable source of electromotive force and a galvanometer of adjustable sensibility; adjusting the galvanometer deflection to a convenient initial reading upon a scale divided in units of resistance (or conductance); successively adjusting the electromotive force to a series of different voltages and simultaneously adjusting the galvanometer so that throughout the said series it shall indicate, by units of the same magnitude, the values of the insulation resistance or conductance corresponding to the series of electromotive forces, and in terms of the initial reading.

6. A method of testing insulation which consists in connecting the insulator in circuit with an adjustable source of electromotive force and an ohmmeter of adjustable sensibility; adjusting the ohmmeter deflection to a convenient initial reading; successively adjusting the electromotive force to a series of different voltages and obtaining a corresponding series of values of the insulation resistance (or conductance) upon the ohmmeter scale.

7. A method of testing insulation which consists in connecting the insulator in circuit with an adjustable source of electromotive force and an ohmmeter of adjustable sensibility; adjusting the ohmmeter deflection to a convenient initial reading; successively adjusting the electromotive force to a series of different voltages and obtaining a corresponding series of values of the insulation resistance (or conductance) upon the ohmmeter scale, in terms of the initial reading.

8. A method of testing insulation which consists in connecting the insulator in circuit with an adjustable source of electromotive force and a Wheatstone bridge; adjusting the bridge by variable resistances to an initial balance; successively changing the value of the electromotive force step by step, and balancing the bridge by successive and separately indicated decrements (or increments) of the variable resistances.

9. A method of testing insulation which consists in connecting the insulator in circuit with an adjustable electromotive force and a differential galvanometer; adjusting the galvanometer by variable resistances to an initial balance; successively changing the value of the electromotive force step by step and balancing the galvanometer by successive and separately indicated decrements (or increments) of the variable resistances.

10. The improvement in the art of ascertaining the condition of insulation which consists in applying to the insulation a definite voltage and measuring the resistance or quantities related thereto at that voltage, then applying a greater voltage and measuring the resistance or quantities related thereto at that voltage, whereby on comparison of the aforesaid resistances or quantities related thereto the condition of the insulation is ascertained.

11. The improvement in the art of ascertaining the condition of insulation which consists in applying to the insulation a series of two or more voltages in ascending order of magnitude suitably graded with regard to the working voltage and measuring the insulation resistance or quantities related thereto at each applied voltage.

In testimony whereof, I have affixed my signature in presence of two witnesses.

SYDNEY EVERSHED.

Witnesses:
G. B. ROLFE,
O. SCHNEIDER.